United States Patent [19]

Price et al.

[11] Patent Number: 4,788,416
[45] Date of Patent: Nov. 29, 1988

[54] DIRECT WAFER TEMPERATURE CONTROL

[75] Inventors: J. B. Price, Scottsdale; Richard S. Rosler, Paradise Valley, both of Ariz.

[73] Assignee: Spectrum Cvd, Inc., Del.

[21] Appl. No.: 20,278

[22] Filed: Mar. 2, 1987

[51] Int. Cl.[4] .............................................. H05B 1/02
[52] U.S. Cl. ...................................... 219/516; 118/50
[58] Field of Search ....................... 219/516, 509, 523; 118/712, 50, 50.1, 620

[56] References Cited

U.S. PATENT DOCUMENTS 3,051,813  8/1962  Busch et al. ..................... 219/516
3,754,118  8/1973  Booker ............................ 219/523

Primary Examiner—E. A. Goldberg
Assistant Examiner—M. M. Lateef
Attorney, Agent, or Firm—Paul F. Wille

[57] ABSTRACT

The temperature of a wafer in a vacuum chamber is measured by way of a tube, containing a thermocouple, extending through a wall of the chamber. The tube is sealed at one end to an aperture in the wall of the system and sealed at the other end with removable sealant.

8 Claims, 1 Drawing Sheet

DIRECT WAFER TEMPERATURE CONTROL

BACKGROUND OF THE INVENTION

This invention relates to chemical vapor deposition (CVD) equipment and, in particular, to apparatus for directly measuring the temperature of a semiconductor wafer.

In operating CVD equipment, it is known that the deposition of material is very dependent upon the temperature at which the chemical reaction is carried out. Sensing this temperature in a reliable manner sufficient for closed loop temperature control has been a continuing problem.

In the past, the temperature within the CVD reaction chamber has been sensed by probes at various locations within the chamber. A problem with these techniques is that the temperature of the wafer is what largely determines deposition parameters, e.g. rate, film properties, and uniformity, not the temperature elsewhere in the chamber.

A problem with placing a probe directly on the front side of the wafer is that it causes a shadow in the film grown on the wafer and may contaminate the film or the wafer. Further, the probe is exposed to the chemicals within the chamber, which tend to deteriorate the probe. Where the wafer is heated via a susceptor, e.g. a graphite block on which it rests, the temperature probe is often placed in the block. This still provides only an approximate temperature reading since the temperature of the susceptor is being measured, not the wafer itself.

In one particular CVD reactor of the prior art, as disclosed in U.S. Pat. No. 4,632,056, the wafer is directly and rapidly heated by a plurality of lamps, i.e. there is no susceptor. The wafer rests on a quartz window and the heat lamps are on the opposite side of the window. Temperature is measured by modeling the wafer with a ceramic disc, the temperature of which is measured directly.

Despite these various attempts, the problem remains of not knowing the actual temperature of the wafer from contact by a probe, e.g. a thermocouple. This is particularly true where the wafer is heated and cooled relatively quickly. The problem is more difficult in systems which directly heat the wafer since the probe cannot interfere with heating the wafer or be subjected to the gases within the chamber. Contacting the backside of the wafer may interfere with heating and/or require machining the quartz window. Quartz is difficult to work with and does not seal well with most ceramics at the temperatures to which it will be subjected in CVD equipment.

In view of the foregoing, it is therefore an object of the present invention to provide means for directly measuring the temperature of a rapidly heated wafer without disturbing the uniform heating thereof.

Another object of the present invention is to provide improved CVD equipment having temperature control based upon direct measurement of wafer temperature.

A further object of the present invention is to provide apparatus for reliably making thermal contact with a semiconductor wafer.

SUMMARY OF THE INVENTION

The foregoing objects are achieved in the present invention wherein a quartz tube is attached to an aperture in a quartz window for a CVD reactor. A probe is inserted through the tube and extends through the window to contact the back side of the wafer. The tube is fused to the window at one end and the probe sealed to the tube with silicone rubber or other curing seal at the other end which is at sufficiently low temperature for stability of these sealing materials.

BRIEF DESCRIPTION OF THE DRAWINGS

A more complete understanding of the present invention can be obtained by considering the following detailed description in conjunction with the accompanying drawings, in which.

DETAILED DESCRIPTION OF THE INVENTION

Figure 1:
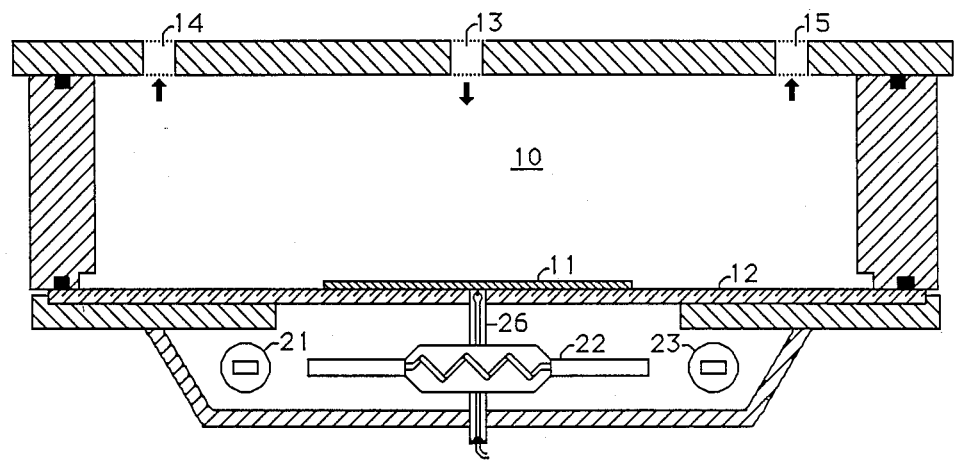
FIG. 1 illustrates a CVD reactor in accordance with the present invention.

FIG. 1 illustrates a preferred embodiment of the present invention wherein plasma reactor chamber 10 contains wafer 11 which is resting on quartz window 12. The window is sealed to the chamber by an O-ring. Chamber 10 comprises various gas supply ports, such as port 13, and gas exhaust ports, such as ports 14 and 15. The details of the construction of a plasma reactor chamber for chemical vapor deposition are well known to those of skill in the art and form no part of the present invention.

Wafer 11 is heated to an appropriate temperature by a plurality of lamps symmetrically disposed about a central axis through the chamber, as illustrated by lamps 21, 22, and 23. The number and location of these lamps is determined, in part, by the size of the wafer to be heated. For example, a 100 mm. diameter wafer is adequately heated by four 1,000 watt lamps. The lamps are turned on for a relatively brief time to heat the wafer to a temperature of about 400° C. For wafers having a diameter of 200 mm., lamps totaling approximately twice the wattage are preferred, i.e. a total of approximately 8,000 watts is preferred to assure adequate, uniform, and rapid heating of the wafer. The lamps are enclosed in a cup-shaped reflector which is preferably plated with gold on the interior surface thereof to improve the reflectance of infrared radiation.

In accordance with the present invention, one is able to contact the back side of wafer 11 with a thermocouple by extending the thermocouple through a quartz tube which is fused to quartz window 12, sealing a hole previously formed in quartz window 12. The tube itself is sealed at the end remote from window 12 by a suitable sealant, such as silicone rubber. The tube through which the thermocouple extends is longer than the height of the reflector housing so that the end of the tube extends outside the housing. Since the end of the tube extends outside the housing, it remains relatively cool and almost any sealant is suitable. Silicone rubber is preferred because it is easily removed for maintenance of the system. In maintaining the system, the quartz window is most easily cleaned by simply immersing it in an acid bath. Since the thermocouple assembly is readily removed, this cleaning operation can still be used.

Figure 2:
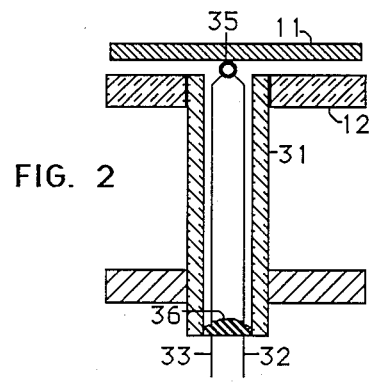
FIG. 2 illustrates a preferred embodiment of how the thermocouple is attached.

FIG. 2 illustrated in greater detail the construction of the probe assembly in accordance with the present invention. Specifically, tube 31, which preferably comprises quartz, extends through a hole in window 12 and is fused thereto. Leads 32 and 33 extend down the length of tube 31 and are attached to thermocouple 35, which is in contact with wafer 11. The open end tube 31 remote from window 12 is sealed with a mass of sealant 36. The dimensions of tube 31, and leads 32 and 33 are chosen such that thermocouple 35 lightly contacts wafer 11. That is, thermocouple 35 contacts wafer 11 with sufficient pressure to assure accurate readings but without damage to the wafer or displacement of the wafer.

Figure 3:
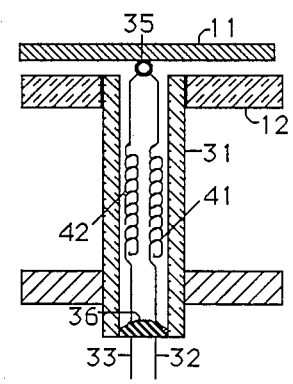
FIG. 3 illustrates an alternative embodiment of how the thermocouple is attached.

While leads 32 and 33 and sealant 36 can exhibit some resiliency, it may be desired to more directly control the resilience of the system by constructing the probe as illustrated in FIG. 3. Specifically, as illustrated in FIG. 3, leads 32 and 33 comprise a resilient portion 41 and 42 respectively. By constructing a resilient portion into the leads, one expands the dimensional tolerances of the system so that thermocouple 35 can extend a greater distance above the upper surface of window 12, yet lightly contact wafer 11 when placed thereon.

Figure 4:
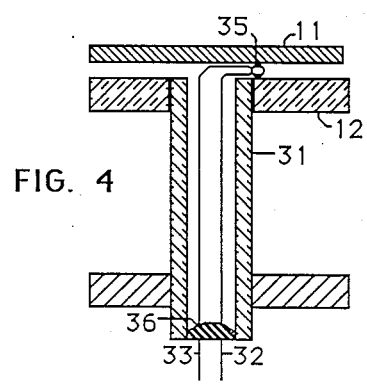
FIG. 4 illustrates an alternative embodiment of how the thermocouple is attached.

FIG. 4 illustrates an alternative embodiment which avoids the question of dimensional tolerances and the expense of constructing resilient leads by extending thermocouple 35 through tube 31 and then bending the leads so that thermocouple 35 rests between window 12 and wafer 11. A further advantage of this ninety degree bend to a direction parallel to a radius of the wafer is that the thermocouple leads adjacent the thermocouple junction lie along an isotherm such that there is little heat loss due to conduction from the junction, resulting in more accurate temperature measurements. Relatively thin thermocouples are available for this purpose and one obtains a relatively rugged system which provides excellent contact to the back side of the wafer.

Figure 5:
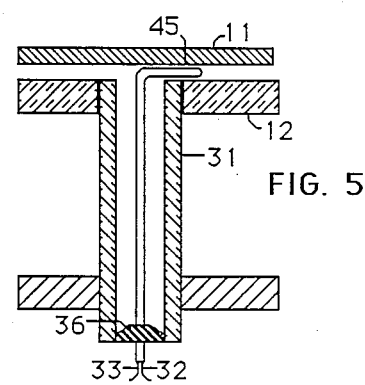
FIG. 5 illustrates a modification of the embodiment of FIG. 4.

FIG. 5 illustrates another alternative embodiment wherein the thermocouple junction and leads are enclosed in sheath 45, which preferably comprises a thermally conductive, low temperature coefficient of expansion material such as "Inconel". As with the embodiment of FIG. 4, the end of the sheath is bent so that the thermocouple junction and a portion of the leads lie on an isotherm.

There is thus provided by the present invention an improved temperature measuring system wherein direct contact is made to a semiconductor wafer. Yet the problems of interfering with the heating of the wafer are minimized by the location of the heating lamps relative to the location of the probe. Further, one does not permanently attach the probe to the quartz window and incur difficulties in forming an adequate seal at that location. The vacuum seal for the chamber is located remote from the window, and the source of heat, and can comprise an impermanent seal, thereby enhancing the maintenance of the system. Thus there is provided a simple, practical, yet accurate means for measuring the temperature of the wafer directly.

Having thus described the invention, it will be apparent to those of ordinary skill in the art that various modifications can be made within the spirit and scope of the present invention. For example, depending upon the number and location of the lamps, one can increase the number of probes, although it is not desirable to add too many probes through window 12. Up to five probes should be sufficient. Tube 31 has been described as fused to window 12. This is intended to mean either that a portion of tube 31 has been melted along with a small portion of window 12 to form a bond or that an intermediate, soft glass was used to form a bond between tube 31 at window 12. While silicone rubber is preferred for sealant 36, it is understood that any suitable seal can be used such as ceramic, glass, or epoxy materials. Alternatively, a suitable metal fitting with one O-ring to the quartz tube and another to a sheath encasing the thermocouple wires can be used instead.

We claim:

1. In apparatus for treating a semiconductor wafer in a vacuum, said apparatus having a chamber including a translucent window on which the wafer rests and including means for heating said wafer through the translucent window, the improvement comprising:
    an aperture in said window at a location on which said wafer rests;
    a translucent tube attached and sealed to said window at said aperture on the outside of said chamber;
    temperature sensing means extending through said tube and said aperture to touch the surface of said wafer in contact with said window; and
    means for sealing the end of said tube remote from said window.

2. The apparatus as set forth in claim 1 wherein said tube extends through said heating means.

3. The apparatus as set forth in claim 2 wherein said sealing means comprises a removable seal.

4. The apparatus as set forth in claim 3 wherein said sealing means comprises silicone rubber.

5. The apparatus as set forth in claim 1 wherein said temperature sensing means comprises a thermocouple at the surface of said window and electrical leads extending through said tube.

6. The apparatus as set forth in claim 5 wherein said leads comprise a resilient portion.

7. The apparatus as set forth in claim 1 wherein said tube is fused to said window.

8. The apparatus as set forth in claim 1 wherein said tube and said window comprise quartz and said tube is attached to said window by glass having a melting point lower than that of quartz.

* * * * *